United States Patent [19]

Beylet et al.

[11] Patent Number: 5,076,642
[45] Date of Patent: Dec. 31, 1991

[54] SADDLE FOR CYCLES

[76] Inventors: Daniel Beylet, 8, rue de Berne, C 7310 Wasselonne; Gérard Haushalter, 3, rue de Bourgogne, 67540 Ostwald, both of France

[21] Appl. No.: 474,256

[22] Filed: Feb. 6, 1990

Related U.S. Application Data

[63] Continuation-in-part of Ser. No. 179,806, Apr. 11, 1988, abandoned.

[30] Foreign Application Priority Data

Apr. 9, 1987 [FR] France .................. 8705176

[51] Int. Cl.⁵ .................. B62J 1/00
[52] U.S. Cl. .................. 297/195; 297/214
[58] Field of Search .............. 297/195, 196, 198, 201, 297/202, 214

[56] References Cited

U.S. PATENT DOCUMENTS 5,011,222 4/1991 Yates et al. .................. 297/214 X Primary Examiner—Laurie K. Cranmer
Attorney, Agent, or Firm—Laubscher, Presta & Laubscher

[57] ABSTRACT

A high performance cycle seat which provides support of the buttock muscles of a cyclist includes a frame, a shell supported on the frame, and wherein the frame and shell include a raised anatomical rear portion which defines a chock for longitudinally supporting the buttocks of the cyclist when the cyclist is hunched over a cycling position. The rear portion includes a forward-facing median wedge, which has a generally epsilon shape in horizontal cross-section. The latter also includes a pair of sloping curved side portions. The wedge prevents lateral displacement of the buttocks, and its width increases in a direction towards its upper rear edge. A longitudinal median zone is arranged forward of the raised rear portion and is aligned with the wedge. A pair of symmetrical support concavities extend downwardly and forwardly from the curved side portions along opposite sides of the median zone, respectively; the zone and the concavities merge towards a forward portion of the seat, so that the seat is configured to maximize the efficiency of the pedalling by the cyclist, by providing optimum support for the buttock muscles.

5 Claims, 6 Drawing Sheets

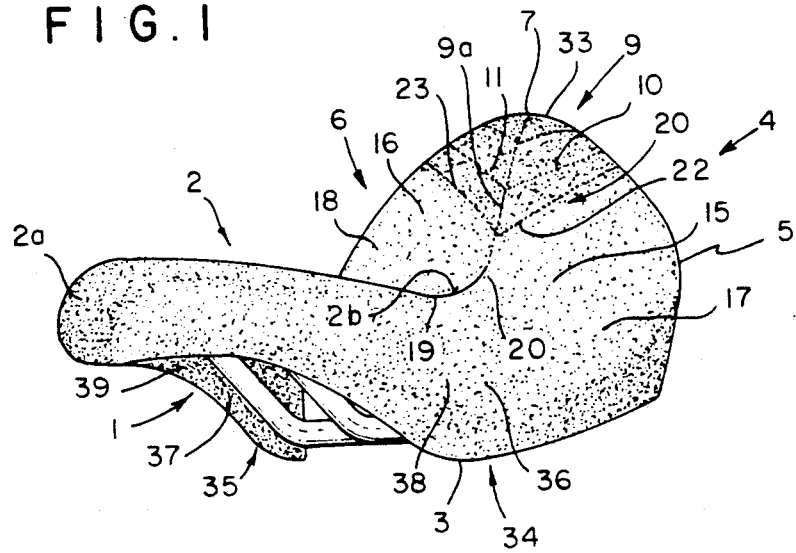
FIG. 1
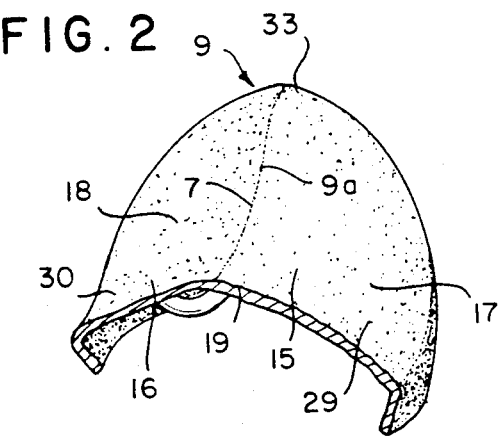
FIG. 2
FIG. 3
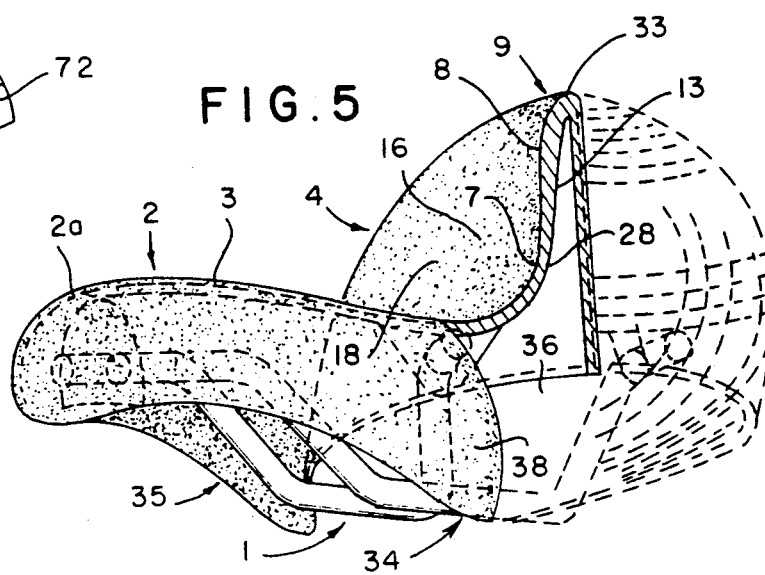
FIG. 4
FIG. 5

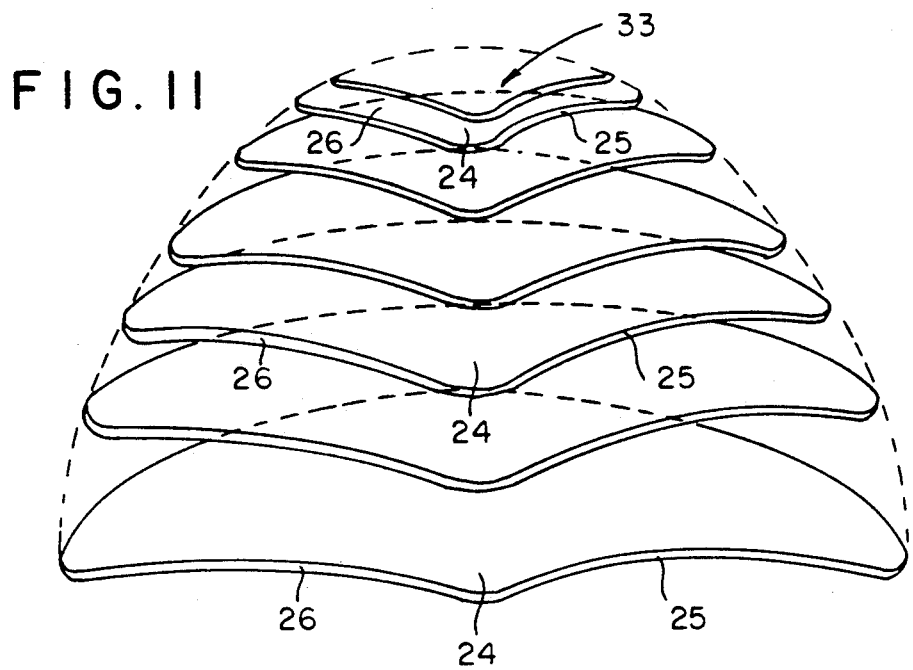
FIG. 11
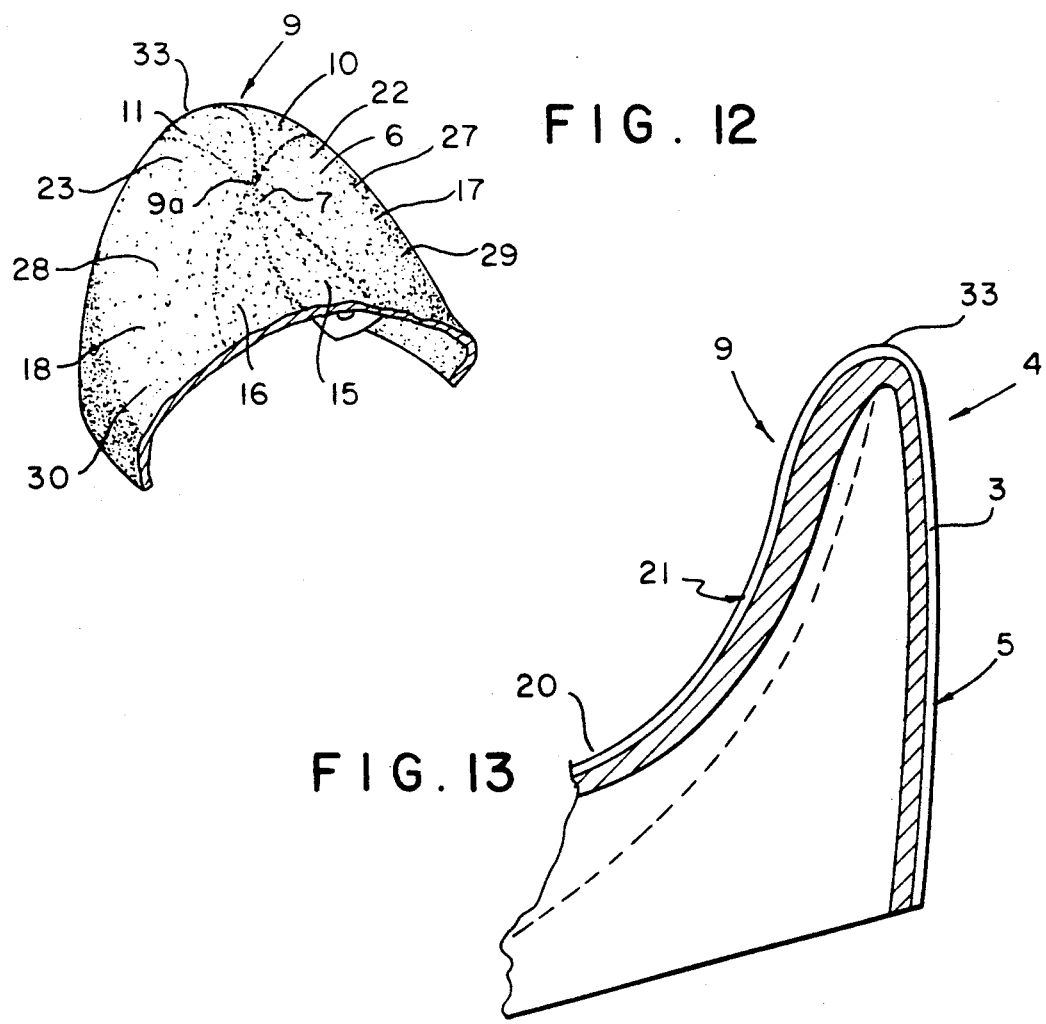
FIG. 12
FIG. 13

SADDLE FOR CYCLES

REFERENCE TO PARENT APPLICATION

The present invention is a Continuation-in-Part application of application Ser. No. 07/179,806, entitled "Saddle for Cycles" filed on Apr. 11, 1988, now abandoned, by the same inventors as those of the present application, namely Daniel BEYLET and Gerard HAUSHALTER.

STATEMENT OF THE INVENTION

The present invention relates to a high-performance saddle for cycling having a raised anatomical rear portion for supporting the buttocks of the cyclist, and, in particular a saddle suitable for sport, in particular competitive sport.

BRIEF DESCRIPTION OF THE PRIOR ART

Pedalling using a saddle with which bicycles of current use are equipped, entails a translatory movement of the general region of the pelvis, having an amplitude of about 6 cm in the form of either a spread-out or compressed, according to the style, waist and shape of the cyclist; this type of movement results in friction or rubbing in the region of the perineum, a very considerable displacement of the knee in the space in question, and a widening of the maximum angle of extension of the upper knee between about 165 degrees to about 170 degrees, where the syndrome of external functional hypertension of the patella takes place.

Studies relating to competitive pedalling an the biomechanics of the cyclist's knee in particular, as well relating to the role of the saddle in facilitating the cyclist's movements, reducing his fatigue have been carried out by specialists in the field of sports medicine.

These studies have revealed the considerable importance of the saddle with regard to assurance and efficiency of movement in the face of the slightest sensation of fatigue, as well as relating to the persistence of the neuro-muscular physical effort.

The conclusions of all these studies have been identical: competitive cycling is not a "seated" sport. Similarly, the performance of the cyclist can be considerably improved by adopting optimum working positions in conjunction with support zones perfectly formed and proportioned to suit the anatomy of the racing cyclist and correctly situated in relation to the muscular masses which are acted upon.

The muscular effort could thus be amplified considerably, could achieve an increase in efficiency, and could be regularly refreshed without excessive fatigue by using a saddle acting as a support for the muscles of the buttocks and which is perfectly conforming, proportioned and dimensioned in relation thereto.

Saddles with a raised read support are known. These relate, for example, to those described in U.S. Pat. No. 3,844,611 issued to YOUNG, U.S. Pat. No. 3,970,345 issued to HOLCOMB and U.S. Pat. No. 4,572,575 issued to GOLDEN.

In all the aforedescribed patents of the prior art, the elevated rear support has only the object to block displacement of the buttocks in a horizontal direction towards the rear, with a view of improving the cyclist's seated position and, in particular, in the case of HOLCOMB, to confer to the user an improvement in the comfort of the seated position and a proper dorsal support permitting, in turn, the surrounding of the entire hip region and that of the lower back. It should be understood that the saddles described in the aforesaid patents have not been conceived to improve the performance of a racing cyclist; on the contrary, they relate to a simple and familiar usage.

As far as YOUNG in concerned, the rear support, which is only slightly elevated and inclined, and which combines support means and a deformable material constituting the saddle, permits reinforcement of the support of the buttocks, and temporary formation of cavities below the buttocks, so as to serve as a lodging for corresponding bones. Alternatively this can be seen as the cavities being created by the bones of the buttocks, i.e. in a vertical direction, as the saddle is weighted by the weight of the cyclist. These thus do not constitue a sufficient wedging for the power movements of the cyclist. In effect, the position from which the racing cyclist applies power is an almost lying-down position on his bicycle.

Under these conditions, this type of saddle does not lend any aid whatsoever to the racing cyclist during his power phase. On the contrary, it only allows the cyclist's buttocks to become depressed, thus putting the racing or sport cyclist into an uncomfortable position for exerting any cycling power, and opposes, in fact, the motive forces which the cyclist is required to develop.

There also exist saddles having a depressed rear portion, such as those described in French patent COUETOUX Nos 327,562 and 356,291. These saddles permit a depressed seated position totally opposed to the direction of the power effort required for pedalling. They thus constitute only saddles of comfort, on which the buttocks repose more easily and more comfortably in the manner of that of an agricultural tractor, and by analogy, that of an armchair.

There is finally down a very old saddle described in the very ancient British patent filed by Paul HAMONIC on May 7, 1894 at a time period of the first bicycles, for which the ideal user position was that of a person seated on a chair.

As has already been stated, the saddle described in that patent includes a depreased rear portion in which the buttocks are lodged, a position totally at variance with a position from where the racing cyclist has to exert a power movement. It appears that this saddle has been studied for pedalling bicycles of a higher elevation, which in turn require a more elevated position for the legs.

For reasons of stability, while exerting a power effort, the saddle should therefore be formed with rear cavities, so as to form an actual receptacle for the buttocks, which become wedged therein by reason of the weight of the user.

That saddle is also formed with a raiser rear border starting from a depressed level, and because of the latter reason, does either not exceed, or exceeds at most slightly, the general horizontal level of the body of the saddle. This border forms the limit of downwardly placed conforming basin-shaped receptacles, which allow the cyclist's rear portion to deform the lower portion of the buttocks, and to hold the buttocks in a lowered position. Consequently, it is laterally wedged between two depressed cavities as in an armchair, or in a traditional tractor seat, when the user is in an upright position, i.e. with his back raised. In other words, this position is neither a power-exerting position, nor an aerodynamic position and the racing cyclist will only rarely take up that position when racing, for this is a position of rest.

Furthermore, the profile of this accomodation does not correspond to any particular position. One deals with approximately spherical depressions prior to accomodating as best as possible the contour of the buttocks in an endeavor to make the user comfortable in a seated position.

The aforesaid saddle of comfort has been studied in particular for providing comfort in a horizontal plane, necessitating as a result of the work of the legs a see-saw movement of the pelvis/buttocks structure, in order to be able to transmit the muscular effort downwardly in the direction of the pedal.

One therefore produces a parasitic movement, which tends to dislodge the pelvis/buttocks structure from the saddle in view of the presence of the depressions or cavities for seating, which are located in depressed portion of the saddle.

Muscle quidance cannot be optimum, and as a result there occurs intense uretheral friction, which is so feared by the racing cyclists.

Consequently, the aforedescribed saddle in the HAMONIC patent is considered totally unsuitable for the cycling sport or competitive cycling, in which it provides but meagre results or a poor performance at most, for the user. Furthermore, no racing saddle for a racing or sports cyclist takes that form, or even a form approximately similar thereto.

Let it be thought that HAMONIC is, so to speak, the forerunner of the present invention, it should be pointed out that the very opposite is true. HAMONIC, in fact, teaches away from the present invention, by stating both in the provisional and the complete specification, that for racing machines the dimensions of the saddle may be reduced.

This is made possible by dispensing with the rear projection, which demonstrates that HAMONIC, far from possibly suggesting the present invention, in fact teaches away from it.

SUMMARY OF THE INVENTION

The present invention's object is to remedy the different disadvantages of known saddles.

The present invention proceeds along a general concept or idea which is totally different.

As a result of its anatomic form and its elevated rear border, it facilitates the cyclist's effort by its efficiency and persistence in time with a view to augment the performance and results obtained by the cyclist.

A saddle of competition, according to the invention, permits the cyclist's pelvis/saddle structure to take up an ideal position, while he exerts a muscular effort by blocking any attempted rearward movements as a result of the raiser rear, by the shape of the associated depressions formed in the saddle, and finally, by the position of the latter with respect to the general line of the saddle, defined by the wedge ahead of the saddles median zone.

The invention thus concerns a high-performance saddle incorporating a support for the muscles of the buttock intended to produce a significant improvement in the competitive results achieved by sports or competitive cyclists, and is characterized in that the transverse supporting structure which it possesses at its rear extremity is a raised anatomical edge, slightly curved towards the front, formed from a single piece with the body of the saddle, and blending progressively into the latter, and then continuing in a generally perpendicular direction, the raised supporting edge exhibiting a symmetrical relief with an upper median wedge and with two connecting concavities extending to either side of a projecting median line, which relief develops in an upward sense from the zone of blending or the source of the raised edge with the body of the saddle.

The saddle proposed by the present invention confers numerous advantages in the field of high-level competitive cycling, of which the main ones are listed below by way of example:

a major increase in competitive performance;
significantly improves biomechanical output;
minimum friction, permitting maximum effort to continue to be applied for a long period, without contact pain;
ergonomic form particularly well suited to the type of movement, enabling fatigue and the sensation of fatigue to be reduced;
ease of manufacture by molding;
a reduction of up to 50% in friction on the perineum;
for a given performance, the knee is spared, both in the short term by reducing the risks of tendinitis, and in the long term by reducing the onset of rotulian chondropathy which brings to an end the career of the cyclist;
it enables all the disadvantages associated with the position known as "on the nose of the saddle" to be avoided;
urethral lamination is significantly reduced, of not suppressed;
the reduced maximum estension of the knee and the improved contribution by the hip/pelvis functional assembly to propulsion reduce the dead-points known as "top-dead-centre", so as to render the plantar or dorsal phases of flexion of the foot actively propulsive.

The object of the invention is to provide and maintain, for the entire duration of the work of pedalling, an optimum support for the effort devoid of physical constraints, with the aim of achieving a significant improvement in the competitive performance of racing cyclists.

BRIEF DESCRIPTION OF THE DRAWING

The present invention will be appreciated on reading the following description, which is given by way of non-restrictive example for one mode of execution, with to the accompanying drawings, in which:

FIG. 1 is a perspective view from the front of the saddle in accordance with the invention;

FIGS. 2 and 3 are simplified cut-away diagrammatic perspective views of the raised rear edge, viewed from the front, illustrating the "epsilon" form;

FIG. 4 is an view of the upper portion of the elevated rear support;

FIG. 5 is a perspective view taken from the front and in the form of a longitudinal section, illustrating in a phantom manner the conformation of the surface of the posterior raised edge, seen from the front;

FIG. 11 is a generally diagrammatic view in the form of multiple successive horizontal sections through the raised edge in accordance with the invention illustrating its vertical structure and the repetition of the "epsilon" form;

FIG. 12 is a simplified perspective view of the rear part of the saddle illustrating as a succession of lines the cavities and the projections of the relief;

FIG. 13 is a view in longitudinal section of the raised edge in accordance with the invention illustrating the upper median wedge;

DETAILED DESCRIPTION

Figure 15:
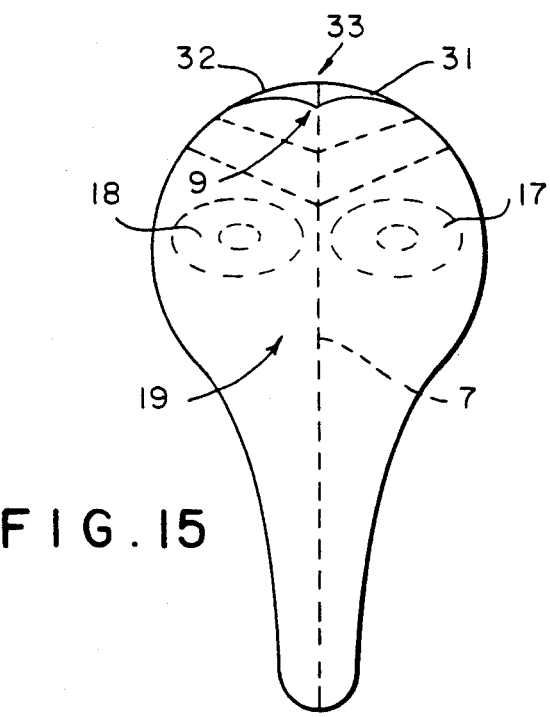
FIG. 15 is a plan view intended to illustrate the dimensional configuration of the saddle, according to the present invention.
Figure 16:
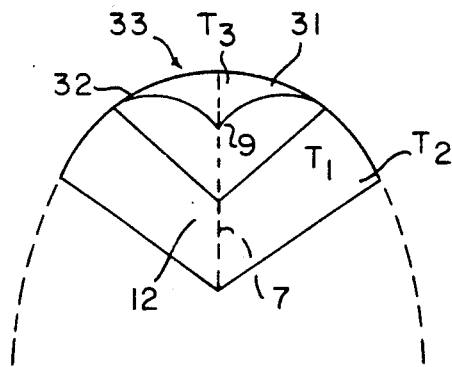
FIG. 16 is a fragmentary front view of the upper rear portion intended to illustrate the dimensional configuration of the saddle according to the present invention.

The general inventive idea consists of causing the posterior part of a saddle for a sports or competition cycle to curve inwards towards the top and to be raised in the form of an anatomically raised edge, conforming longitudinaly and transversaly the contour of the cyclist's buttocks with a longitudinal and transversal supporting relief, so as to produce for the buttocks adapted to the morphology of the racing cyclist, with the aim of achieving the necessary longitudinal and transversal support/envelopment for a good seated position, for ensuring movement, for the efficiency of the effort, and for a significant reduction in the fatigue induced by friction and the discomfort which they cause directly to the skin, and in wear in the joints The saddle in accordance with the present invention consists of a frame 1 supporting the body of the saddle, which in turn is constituted by a shell 2 covered with a flexible covering 3. The shell 2, which may be produced, for example, by molding in a hard portion 4 that is connected with a front portion 2a by a transition portion 2b. Adjacent its upper end, the rear portion contains a forwardly directed wedge portion 9 having the configuration of an inverted isosceles triangle, which wedge portion terminates at its lower end in an apex 9a located on a generally S-shaped center ridge line 7. The remaining lower rear portion 6 includes a pair of side walls 15 and 16 arranged on opposite sides of the ridge line 7, respectively, which side walls contain concavities 17 and 18, respectively, as best shown in FIGS. 16 and 15.

This rear portion 4 is generally oriented at right angles to the body of the saddle, but is slightly inclined to the rear.

The shell 2 at the rear thus conforms in general with a raised anatomic posterior rear portion. The general and particular forms of this anatomical raised edge, and those of the zone of blending with the body per se of the saddle, are described below and are represented in detail in the accompanying figures.

The anatomical raised, rear portion 4 is, as shown, an integral part of the shell. It constitutes a supporting abutment against which the active muscles of the buttocks rest directly via their rear part, and the sacro-coccyx rests indirectly via the muscular masses and the ligamentary structures. The pelvis is thus restricted in its rearward displacement by the reaction of the muscular and ligamentary structures which connect it to the posterior parts of the ischia and therefore permit a more intensive and sustained movement of the racing cyclist. The object of the raised rear portion is to block the rearward movement of the hip/pelvis assembly, and to provide a support offering support/envelopment, not only transversally, but also longitudinally.

Its height exceeds about 5-8 relative to the front portions 22 of the saddle. It does not consitute a rear support, but an abutment to limit the racing cyclist's rearward movement.

As will be appreciated, from the figures, the raised anatomical posterior rear portion 4 follows a direction generally perpendicular to the plane of the seated position and its front face is slightly inclined towards the rear. It has a profile 5 of generally slightly curved form towards the front, in order to conform the general lines of the base of the back of the racing cyclist in his crouched working position.

According to another characteristic, the raised posterior rear portion 4 constitutes a zone having a greater thickness than the remainder of the saddle, thus ensuring the rigidity of the whole assembly and its secure attachment to the frame, formed of elastic steel rods or in conjunction with springs, thus assuring the mechanical coupling of the structural support of the saddle with that of the frame of the bicycle.

More specifically, the front surface of the raised posterior rear portion 4, that is to say the part facing towards the front of the saddle, has an anatomic relief pattern of cavities and projections relative to a generally S-shaped central ridge line 7. At its upper end, the convex portion of the ridge line 7 contains a wedge portion 9 including a pair of symmetrically and slightly convex flanks or sloping surfaces 10 and 11 forming respective joining surfaces having two progressive and variable curvatures up to zones limited in slope and converging in the median part in the manner of a "V" centered on the ridge line 7.

This wedge portion 9 ascends at its lower end from an apex 9a on ridge line 7 upwardly until it merges with the adjacent periphery of the raised border in the general form of a substantially double triangle, wherein a small triangular section T1 is inscribed in a larger triangular sector T2, as can be seen from the figures, particularly FIG. 4 and the FIG. 16. It is the object of the upper median wedge 9 to laterally immobilize the lower pelvis/buttocks region, by contituting symmetrical support for the upper median body zone 12 of the rider between the buttocks, according to a biconvex anatomic profile conforming transversely and longitudinally to the aforesaid body zone 12.

The upper median wedge 9 progresses slightly forwardly being flattened in the process within 1 to 2 cm.

Figure 7:
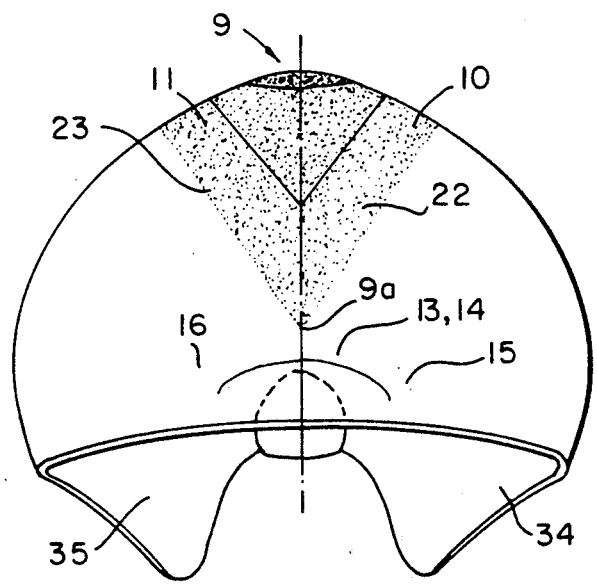
FIG. 7 is a simplified diagrammatic view of the posterior raised edge in accordance with the invention, seen from the rear, illustrating the "epsilon" form.
Figure 8:
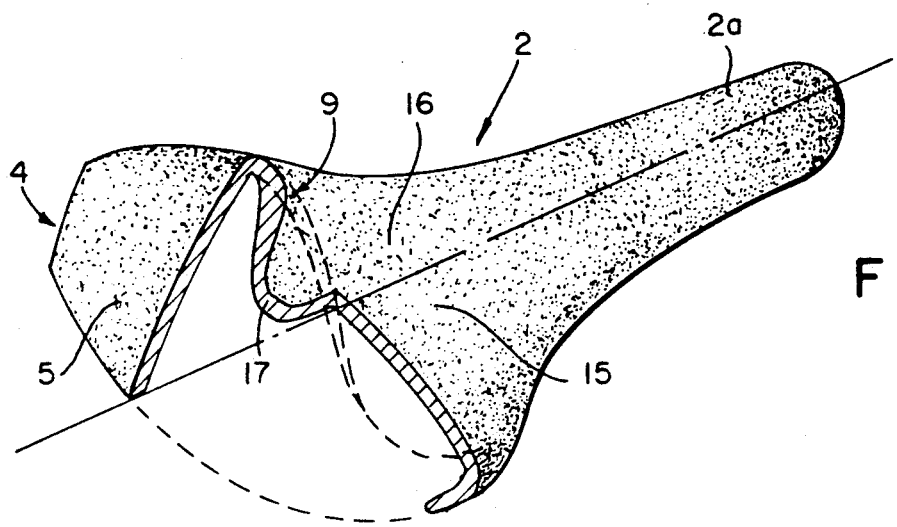
FIG. 8 is a partly-sectioned perspective view from the rear illustrating as a cross-section of the raised edge, seen from the rear and conforming the shape of the cyclist's buttocks.
Figure 9:
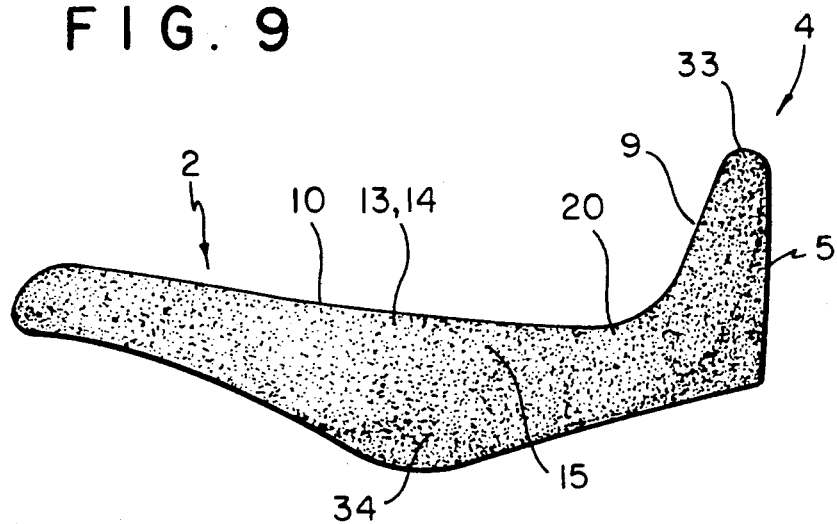
FIG. 9 is a side elevational view in the form of multiple successive vertical longitudinal sections illustrating the longitudinal structure of the saddle.
Figure 10:
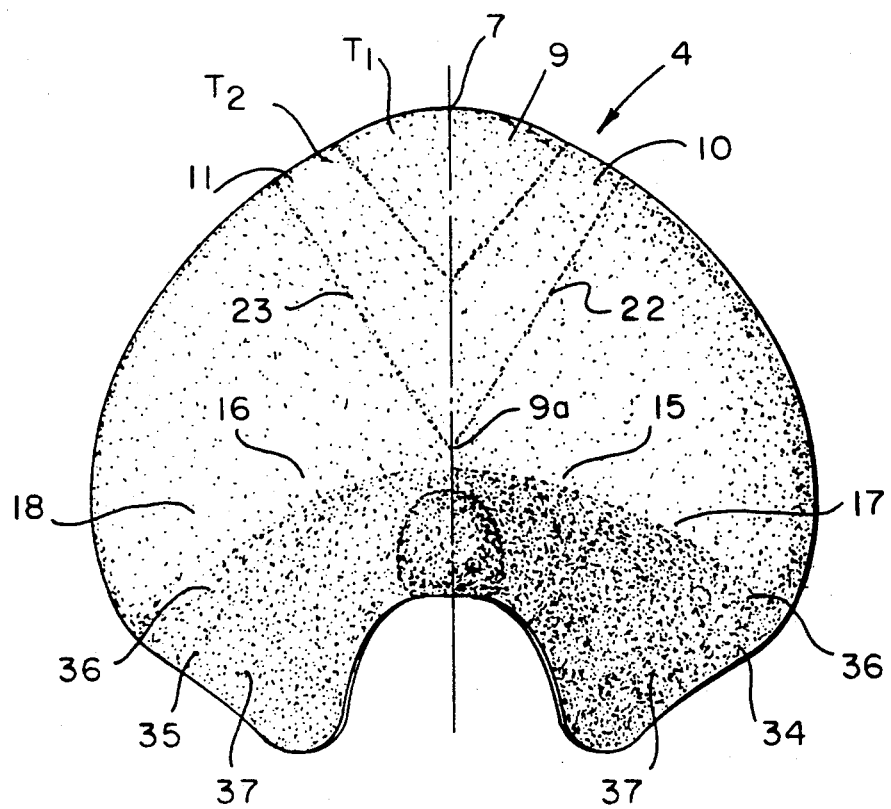
FIG. 10 is a front view in the form of multiple successive transversal sections illustrating the transversal structure of the saddle.
Figure 14:
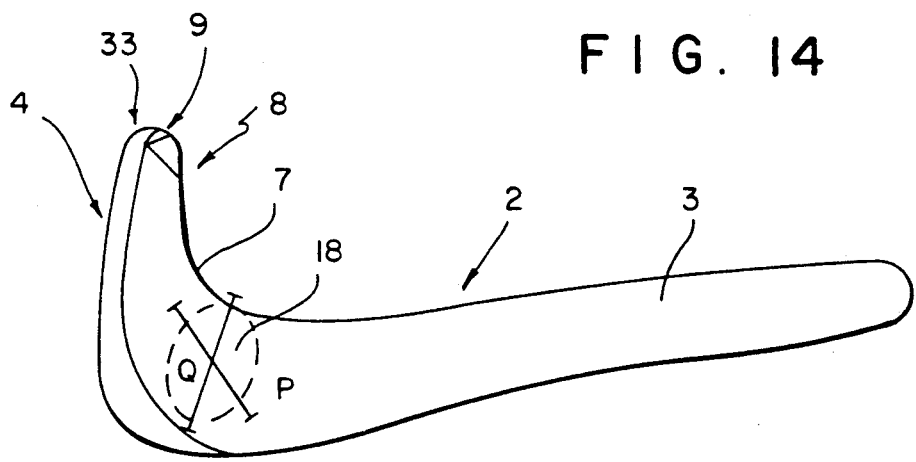
FIG. 14 is a fragmentary perspective view intended to illustrate dimensional configuration of the saddle or cycle seat according to the present invention.

The lower rear portion 6 is connected with the saddle front portion 2a by a transition portion 2b, said lower rear portion having two slightly curved concave sloping sides 15 and 16 containing support concavities 17 and 18, respectively. The lower rear portion 6 blends with transition portion 2b at blending zone 20, and transition portion 2b blends with front portion 2b at blending zone 19. At blending zone 20, the rear ridge line 7 stops and becomes transition ridge line 14. At wedge apex 9a on ridge line 7, two convex lines 22 and 23 (best shown in FIGS. 7 and 14) define the lower origins of the generally triangular wedge portion 9.

As represented in the figures, the cross-section of the upper median wedge 9 assumes on embossed region the general form in relief of the symmetrical Greek letter "epsilon" or the Arabic numeral "three" arranged transversally recumbent along the longitudinal axis of the saddle, with its central branch facing towards the front of the saddle.

This embossed region is progressively modified in flaring towards the bottom.

This characteristic is more easily appreciated and in greater detail, from FIG. 11 in which the posterior raised rear portion in with the invention is shown cut into parallel slices in the seating plane of the saddle. Each slice through the cross-section has this general form in profile In order to rightfully follow the variations in curvature in the successive forms of the slices through the cross-section, the slices broaden out progressively from top to bottom. This type of representation permits the relief of the raised edge 4 to be defined and reconstituted fully.

As previously described, the technical forms of the upper median wedge 9 project progressively upwards. This characteristic appears in each slice through the cross-section, the "epsilon" form of which has a point 24 and symmetrical branches 25 and 26 broadening out progressively towards the base and simultaneously increasing in size until they merge at the limit of the zone 19 with the body of the saddle.

Figure 6:
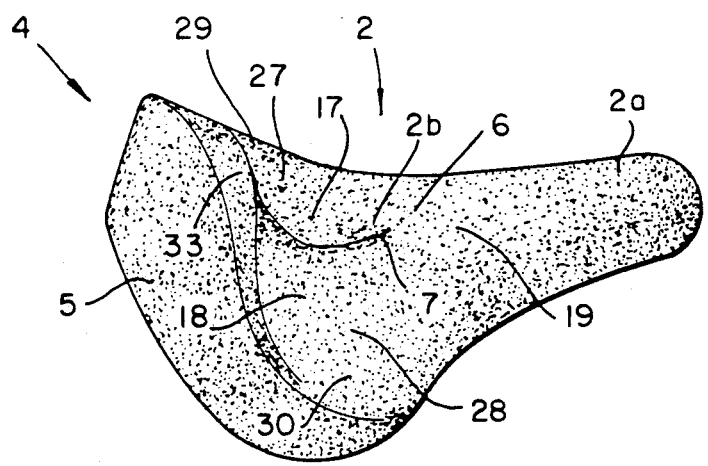
FIG. 6 is a perspective view from the rear of the saddle in accordance with the invention.

The concavities 17 and 18 which provide support extend to either side of the lower rear portion 6 and have slightly depressed general form, each constituting in its central areas a dished zone 27 and 28 (FIG. 6) of shallow depth, the surrounding surfaces 29 and 30 of which as such constitute zones of progressive blending through variation of curvature with the adjacent elements of the relief: the lower rear portion 6, the bases of the upper median wedge 9, the external contours of and the raised rear portion 4, and the blending zone 19 with the body of the saddle and others. (FIG. 12).

According to one variant, the base of the dished areas and their surrounding areas assume a generally anatomical form adapted to serve as a seating for each ischium enveloped in a dynamic fashion by the muscles of the buttocks when in action; so that these are supported, on one hand, within the dished areas, and on the other hand, on the peripheral surrounding zones of the dished areas.

According to another variant, the base of each supporting concavity 17 and 18 extends from the blending zone 19 with the body of the saddle and continues in an upward direction.

It is important to note that the axes of the bases of the dished areas 27 and 28 do not run in a perfectly straight line upwards in the manner of the comfort saddles which have dished areas. On the contrary, the axes of the bases of the dished areas are inclined slightly downwards in relation to the vertical, in such a way as to constitute a steading support which is ideal for each group of muscles of the buttocks with the racing cyclist in the working position. Initial steadying is provided in this way.

Additional steadying is provided by the upper zones 22, 23 and 10, 11 of the abutment concavities formed in the front surface of the anatomical raised rear portion 4 and which constitute an upward extension to the top of the dished areas 27, 28.

The saddle also affords transversal steadying via the upper median wedge 9, as clearly illustrated in the figures. This transversal steadying is the result of the steadying support of the base 12 between the buttocks on and to either side of said wedge 9.

The upper median wedge 9 is bounded in its upper part by curvilinear blending surfaces 31 and 32 (FIGS. 15 and 16) converging towards the tip of the upper median wedge 9 and joined, progressively to the coutour line of the raised rear portion 4 in accordance with the invention. The surfaces 31 and 32 define together with the adjacent portion of the external contour of the raised rear portion an upper connection space 33, which is slightly curved and of generally triangular form, constituting a third triangular sector T3 inscribed within the triangular sectors T2 and T1.

The cross-section of the forward portion 22 of the seat has the shape of an inverted U, including a center portion and two legs. The extreme lateral and transition zones 34 and 35 in the forward portion of the seat, and between the raised rear portion 4, and the stem of the saddle are each formed by rounded zones 36 and 37, respectively, as seen in a downward direction, and are followed by respective lower flat transition zones 38 and 39 favoring a muscular drop-kick in a reverse region of the start of the thigh (FIGS. 7, 9, 10 and 18).

Practical comparative trial runs between two racing cyclists of substantially equal caliber, competing on two respective identical bicycles side by side, other than that one of the bicycles was equipped with a conventional saddle, while the other was equipped with the high performance saddle according to the present invention, have shown an incontestable superiority of the latter.

Two identical bicycles with the bracket limited to 50×16=6,90 meters

Each cyclist has cycled on a bicycle equipped alternatively with a conventional saddle, or with a saddle equipped with a support for the muscles of the buttocks, the latter having three control levels:
1st control level: saddle controlled by means of the buttocks pressure on the support;
2nd control level: saddle controlled with the buttocks in only light or superficial contact with the support;
3rd control level: saddle controlled without any contact of the buttocks with the support.

These measures were effected with the aid of an electronic chronometer with a facility for automatic decoupling by means of a magnetic tape on the track, which was set for one kilometer.

The time was measured as shown in the attached table.

It will be noted that the control of the saddle is very important.

In the first case that greatest difference has been shown; the saddle in permanent contact maintains the pelvis/buttocks structure in a working position yielding optimum results; for the two racing cyclists the greatest differential time gain is obtained here.

In the second case, the support for the buttocks is only maintained lightly or superficially; the deviation in time between usage of the saddle equipped with support for the buttocks and that of a conventional saddle is reduced.

In the third case, the deviation in time is so small, that it can be considered zero in practice, considering the psychological effect produced to begin with on each cyclist.

In the first-named two control-cases, it was possible to film the optimum output of the racer, and the considerably greater simplicity in the movement of the pelvis/buttocks/legs ensemble realized by setting benchmarks on the pelvis and left leg of each racing cyclist.

While no experimental results are available to-date on the performance of a saddle along the HAMONIC type, it will not be too difficult to extrapolate performance results for the latter type of saddle, when one realizes that the rear border of minimal height of the HAMONIC saddle, in terms of the experimental results available to-date, amounts at most to no more than a partial, and very limited contact of the pelvis/buttocks ensemble of the rider with that rear border of minimal height.

It is therefore believed that at most the experimental results of the second control level would be applicable to the HAMONIC saddle, which is again considerably inferior to that for the saddle according to the present invention, not even taking into account the other detrimental characteristics of the HAMONIC type saddle as far as a racing bicyclist is concerned.

The sports and performance results are obtained due to the original particularities in shape and dimensions of the saddle according to the present invention, whose general configuration in relief is considered particularly well adapted to the anatomy of the racing cyclist.

In view of the anatomic features particularly well adapted to the effort exerted by, and the morphology of the racing cyclist, it is possible to envisage a performance increase and also an increase with respect to an effort effected in the face of, or resistance thereto, in the manner as those described hereinafter, and confirmed by the trials.

This perfect adaptation to the anatomy of the racing cyclist has been studied for a long time by Dr. HAUSHALTER, one of the co-inventors. It is obtained by the dimensional characteristics and shapes developed hereinafter.

In order that the invention be better understood in its particularly well adapted anatomical form, the following parameters will be indicated hereinafter by means of a non-limiting example, namely the approximate dimensions of the shell of the seat and its rear embossements, which should be augmented by 1 to 2 cm, because they represent the thickness of the clothing.

Figure 17:
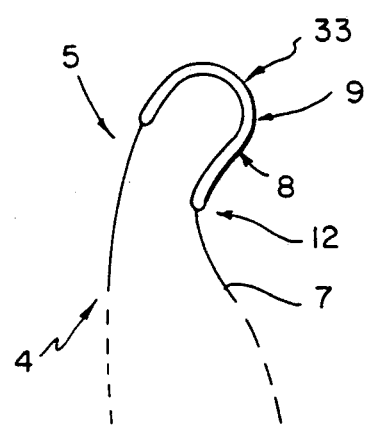
FIG. 17 is a side view corresponding to FIG. 16, intended illustrate the dimensional configuration of the saddle according to the present invention.
Figure 18:
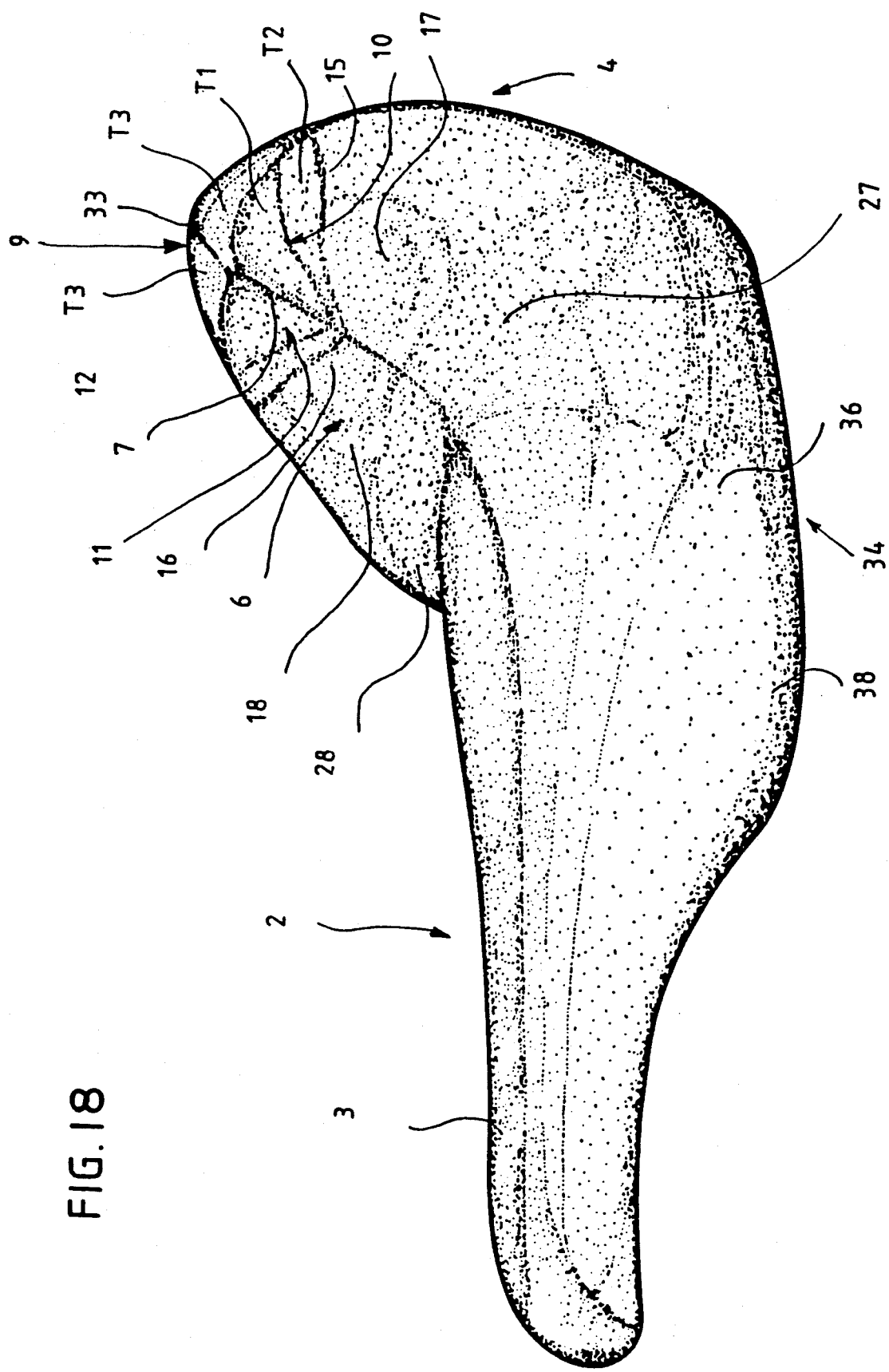
FIG. 18 is an additional perspective view showing the saddle according to the present invention in its entirety.

1. Total length: 28 to 29 cm
2. Width dimensions of the saddle:
   in the forward extremity: 2 to 3 cm
   at the origin of the apex: 6 to 7 cm
   largest dimensions of the rear part: 14 to 15 cm
3. Total height of the raised rear portion: 5 to 7 cm
4. Point of origin of the raised rear portion with respect to the forward extremity: 24 cm to 25 cm
5. Maximum dimension by which the wedge portion projects forwardly of the lower rear portion: 1 to 2 cm
6. Position of the centers of gravity of the concavities with respect to the general median line of the saddle: 2-3 cm
7. Approximate dimensions of the upper wedge rear portion in the general form of an isosceles triangle or of a sector (FIGS. 15, 16, 17):
   Small triangle or sector in solid strong lines:
      straight sides: 3 to 4 cm
      curvilinear sides: 6 to 8 cm
   Large triangle or sector in solid thin lines:
      straight sides: 3 to 4 cm
      curvilinear sides: 6 to 8 cm
   Angle subtended by sector approximately 60 degrees
8. Inclination of the forward face of the rear border inclined with respect to the general horizontal plan of the saddle: 110 to 130 degrees
9. Depth of the lateral cavities:
   With respect to the line P in FIG. 14: 2 to 3 cm
   With respect to the transversal line Q: 1 to 2 cm
10. Extend of the lateral cavities:
    a generally transverse zone on each side of the median line: from 4 to 5 cm along the major axis, and 2 to 3 cm along the minor axis.

One will become immediately aware of the considerable efficiency of the saddle in accordance with the invention from the significant reduction in the amplitude of the movements necessary for one revolution of the crank, and from the suppression of the dead points. The level of fatigue when working, the wear in the joints and the friction on the saddle are also correlatively reduced.

The following average dimensions, which may be appropriate for a classical racing cyclist of European type, are given by way of example and for guidance only:
   Length: 28 to 30 cm
   Width: 14 to 15 cm
   Overall height of the saddle: 11 to 15 cm
   Height of raised edge: 5 to 7 cm in relation to the bare plane of the seated position.

The length of the saddle can be reduced by shortening the length of the nose.

The dimensions and the curvature of the concavities may, of course vary slightly.

Furthermore, it is obvious that the dimensions of an ideal saddle must be personalized, that is to say adapted perfectly to the dimensions and to the morphology of the user.

The foregoing description relates to a high-performance saddle for the competitive cyclist. It must be appreciated that the present saddle cannot be restricted to this single area, but can be used equally well to equip touring cycles, indoor exercise cycles, and physiotherapy cycles, as well as other existing cycles or cycles which are yet to be invented, for example bicycles for artistic use or the cycles known as "all-terrain cycles".

The posterior raised edge in accordance with the invention can also be executed specifically for races against the clock over a pure uphill section, which would avoid the waste of energy associated with the style of pedalling known as "standing on the pedals" by utilizing the maintenance of support which the saddle provides to advantage.

The invention is described above in detail. However, it is intended that various simple modifications, additions, direct variants and substitutions by equivalent means should be included within the scope of the present protection.

I claim:

1. A high performance cycle seat which provides support for the buttock muscles of a cyclist, comprising:

(a) a frame (1); and
(b) a shell (2) supported on said frame, said shell including:
  (1) a generally horizontal forward portion (2a) having in transverse cross-section an inverted U-shaped configuration;
  (2) a raised anatomical rear portion (4); and
  (3) a transition portion (2b) connecting said rear and forward portions;
  (4) said raised rear portion including:
    (a) an upper forwardly-extending convex wedge portion 9 having generally the configuration of a sector-shaped inverted isosceles triangle the apex (9a) of which extends downwardly; and
    (b) a generally concave lower rear portion (6), said upper wedge and lower rear portions having a configuration to define an S-shaped ridge line (7) contained in a vertical plane extending longitudinally centrally of said seat, said apex being contained on said ridge line and the sides (22,23) of said wedge portion extending from said apex to subtend an angle of about 60 degrees;
    (c) said lower rear portion having on opposite sides of said ridge line sloping side surfaces (15, 16) each containing a support concavity (17, 18) for receiving the ischium bones, respectively, of the cyclist.

2. A cycle seat as defined in claim 1, wherein said raised rear portion extends upwardly about 5 to 7 centimeters relative to said shell forward portion.

3. A cycle seat as defined in claim 1, wherein said support concavities include central portions which define hollow basins (27,28) having lateral circumferential surfaces (29,30) that merge progressively with the adjacent area of said raised rear portion.

4. A cycle seat as defined in claim 3, wherein each basin includes a bottom portion that is elongated in the vertical direction.

5. A cycle seat as defined in claim 1, wherein the thickness of said raised rear portion is greater than that of the remainder of the shell, thereby to increase the rigidity of said shell.

* * * * *